United States Patent [19]

Horiguchi

[11] Patent Number: 4,929,938

[45] Date of Patent: May 29, 1990

[54] AREA SEARCHING SYSTEM

[75] Inventor: Ryuji Horiguchi, Tokyo, Japan

[73] Assignee: NEC Corporation, Tokyo, Japan

[21] Appl. No.: 156,117

[22] Filed: Feb. 16, 1988

[30] Foreign Application Priority Data

Feb. 13, 1987 [JP] Japan .................................. 62-31025

[51] Int. Cl.$^5$ ............................................. G09G 1/14
[52] U.S. Cl. .................................... 340/747; 340/728
[58] Field of Search ............... 340/747, 728, 703, 744, 340/803; 382/22; 364/521, 522, 518

[56] References Cited

U.S. PATENT DOCUMENTS 4,626,838 12/1986 Tsujioka et al. ..................... 340/747
4,788,538 11/1988 Klein et al. ......................... 340/747

OTHER PUBLICATIONS

"Polygon Painting Method", IBM Technical Disclosure Bulletin, vol. 28, No. 7, Dec. 1985, pp. 3080-3081.

*Primary Examiner*—Alvin Oberley
*Attorney, Agent, or Firm*—Sughrue, Mion, Zinn, Macpeak & Seas

[57] ABSTRACT

A system for searching a predetermined boundary of a closed pattern comprises a memory for storing data of a given closed pattern, and a reading unit for sequentially reading each pair of vertically adjacent words of each pair of vertically adjacent lines of the given closed pattern from the memory in the same reading direction. A search unit receives the pair of vertically adjacent words from the reading unit for searching a boundary in each of the pair of vertically adjacent words and for generating data indicative of a position of a found boundary for each of the pair of vertically adjacent words. A comparison unit receives the boundary position data of the each pair of vertically adjacent words so as to judge in which of the vertically adjacent words the boundary is found earlier than the other. A processing unit coupled to the comparison unit determines whether or not the found boundary is the predetermined boundary.

3 Claims, 5 Drawing Sheets

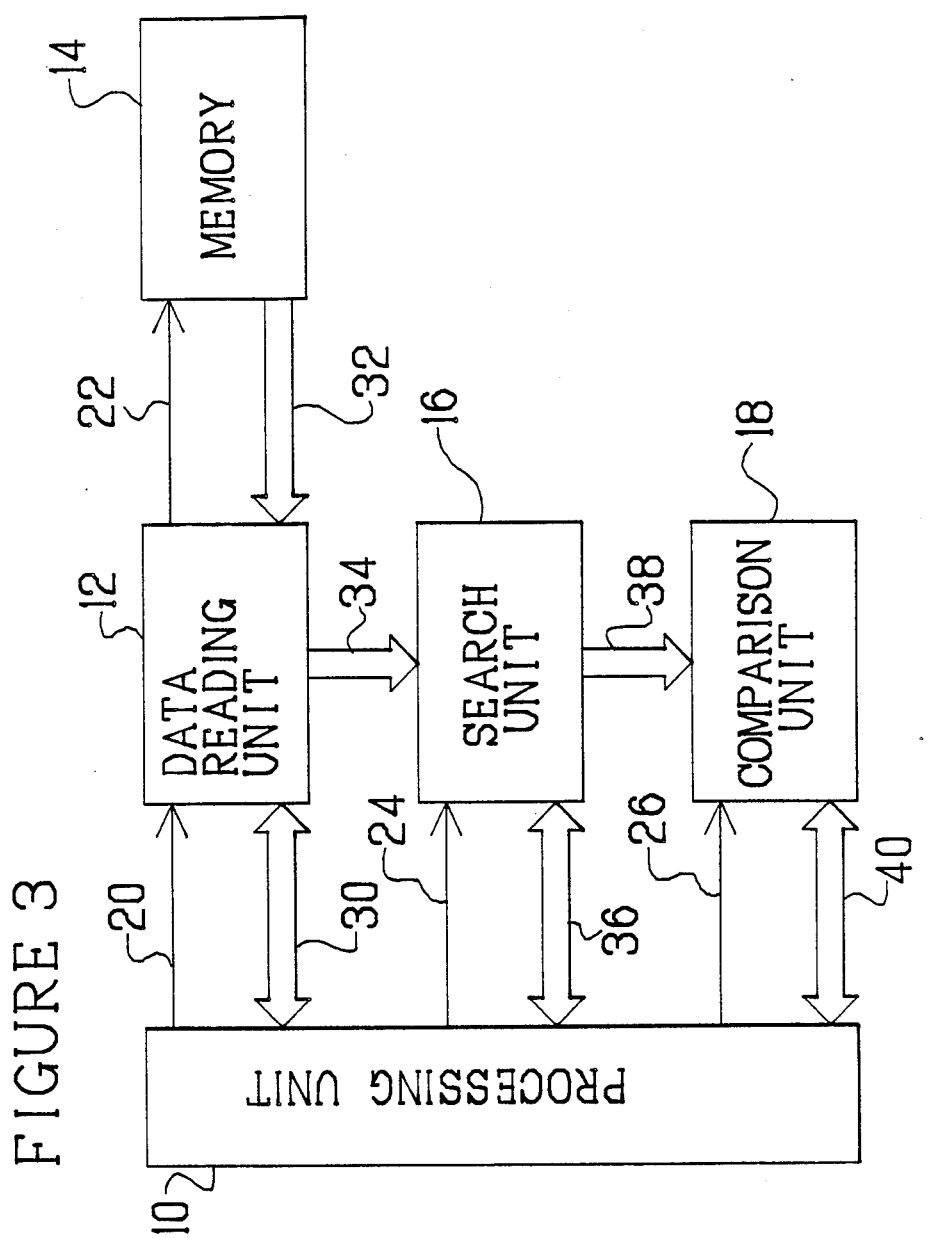

AREA SEARCHING SYSTEM

BACKGROUND OF THE INVENTION

1. Field of the Invention

The present invention relates to a pattern processing system and more specifically to an area searching system used in a processing for painting the inside of a closed area or contour of a drawn pattern.

2. Description of Related Art

Heretofore, pattern processing systems having a graphic drawing function, such as so called personal computers, have been required to have a function of painting an inside of a closed area or contour of a drawn pattern at a high speed. In a general case, the drawn pattern is stored in a memory, and therefore, the closed area to be painted is detected by searching a content of the memory.

A conventional method has been effective in detecting an area to be painted in the case of a simple configuration of closed pattern, but has needed a long time for searching in the case of a complicated configuration of closed pattern such as a pattern having therein another closed pattern.

SUMMARY OF THE INVENTION

Accordingly, it is an object of the present invention to provide an area searching system which has overcome the above mentioned defect of the conventional one.

Another object of the present invention is to provide an area searching system capable of searching an area to be painted at a high speed even in the case of a complicated configuration of closed pattern.

Still another object of the present invention is to provide an area searching system which is capable of searching an area to be painted in the case of a complicated configuration of closed pattern at a high speed and with a small number of additional circuits.

The above and other objects of the present invention are achieved in accordance with the present invention by a system for searching a predetermined boundary of a closed pattern comprising a memory for storing data of a given closed pattern, a reading unit for sequentially reading each pair of vertically adjacent words of each pair of vertically adjacent lines of the given closed pattern from the memory in the same reading direction, a search unit receiving the pair of vertically adjacent words from the reading unit for searching a boundary in each of the pair of vertically adjacent words and for generating data indicative of a position of a boundary found in each of the pair of vertically adjacent words, a comparison unit receiving the boundary position data of the each pair of vertically adjacent words so as to judge in which of the vertically adjacent words the boundary is found earlier than the other, and a processing unit coupled to the comparison unit for determining whether or not the found boundary is the predetermined boundary.

Specifically, the search unit firstly conducts a boundary search for both of the pair of vertically adjacent words by detecting a change of a first logic value to a second logic value in the data reading direction, and after a boundary is found in a first line of the pair of vertically adjacent lines, the search unit executes a boundary search for a word of the first line in which the boundary has already been found, by detecting a change of the second logic value to the first logic value in the data reading direction, and on the other hand, the search unit continues the boundary search performed by detecting a change of the first logic value to the second logic value in the data reading direction, for a word of the other line in which the boundary has not yet been found. After the first mentioned boundary is found in the first line, if a second boundary is found again in a word of the first line, the processing unit controls the searching unit to cause it to conduct, for a word of the first line again, the boundary search performed by detecting a change of the first logic value to the second logic value in the data reading direction. A boundary of the first line found thereafter is judged to be the predetermined boundary.

The above and other objects, features and advantages of the present invention will be apparent from the following description of a preferred embodiment of the invention with reference to the accompanying drawings.

BRIEF DESCRIPTION OF THE DRAWINGS

FIG. 3 is a block diagram of an embodiment of the area searching system in accordance with the present invention;

DESCRIPTION OF THE PREFERRED EMBODIMENT

Figure 1A:
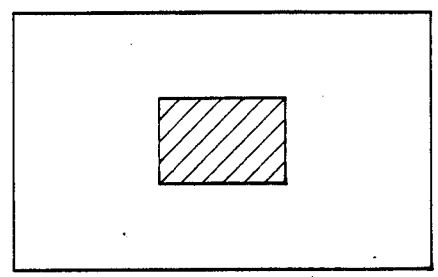
FIG. 1A, 1B and 1C illustrate a principle of searching an area to be painted.
Figure 1B:
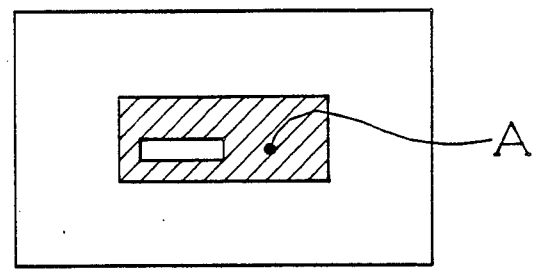
Figure 1C:
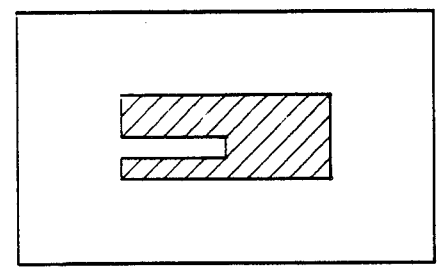

First, one example of painting an internal area of a closed pattern will be described with reference to FIG. 1A, 1B and 1C which illustrate a principle of searching an area to be painted. The simplest example of painting an internal area of a closed pattern can be exemplified by a case of painting an internal area of a perfectly closed rectangle as shown in FIG. 1A. In FIG. 1A, the area of painted is hatched. The pattern information indicated in a CRT as shown in FIG. 1A is stored in a memory mapped in the form of a two dimensional plane. Therefore, in the case shown in FIG. 1A, bits corresponding to the rectangle area are written with "0", and the other bits are written with "1". In the case of searching the area to be painted, a search starting point is set to any point within the rectangular area, and then the bit information is sequentially read out from the memory in a leftward or rightward direction from the search starting point so that a discrimination is made on whether the read-out bit information is "1" or "0". In the shown example, since the edge or contour of the rectangle is "1", a position where the bit information read out of the memory first becomes "1" is a boundary.

In the prior art, the above mentioned search is made for each one line (i.e., each one horizontal scan line). In addition, since it takes a long time if the information is read out bit by bit and the discrimination is made bit by bit, the conventional system is adapted to read the information in a unit of one word (for example 16 bits) and to execute the boundary search in a unit of word.

In the case of painting the whole of the internal area of the simple rectangle as shown in FIG. 1A, the above mentioned conventional method for searching the area can be used without significant problems. However, in the case of perfectly painting an internal area of a closed pattern having therein another small closed area but excluding the internal small area, the above mentioned method is not so effective. For example, assume that bits corresponding to an internal space of a large rectangle area are written with "0", and the other bits corresponding to the outside area of the large rectangle and an internal space of a small rectangle area are written with "1". Also assume that the search starting point is set to A point in FIG. 1B and the search is conducted in a leftward direction. In this case, the bit information of "1" is detected at a rightside edge of the small ares, and therefore, a boundary which is different from a boundary to be detected is erroneously recognized. As a result, an mistaken area is painted as shown in FIG. 1C.

In order to avoid the above mentioned inconvenience, the following method has been proposed and reduced into practice. If explanation will be made with reference to an example shown in FIG. 2 and on assumption that the search is conducted in a leftward direction in FIG. 2. Here, a search for detecting how long the "0" bits continue from the search starting point in the leftward direction is called a "1/0 boundary search", and a search for detecting a position of appearance of "0" bit in the leftward direction while neglecting a continuation of "1" bits is called a "0/1 boundary search". In addition, each of small blocks given the circled numbers in FIG. 2 corresponds to one word of the memory.

Figure 2A:
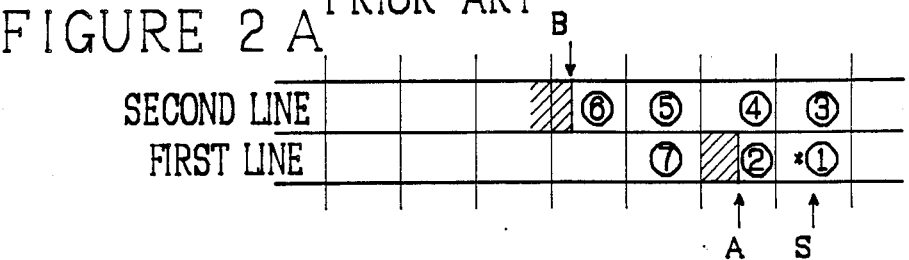
FIG. 2A, 2B and 2C illustrate a conventional manner of searching an area to be painted.

In the example shown in FIG. 2A, information is read out of the memory from a word 1 including the search starting point S for a first line, and a discrimination is made about whether the read information is "1" or "0". If "1" is found, the search is completed. But, in this example, since all the bits of the block has "0", the "1/0 boundary search" is conducted leftwardly from the search starting point S. As a result, a next word 2 is read out and the search is conducted. Then, a boundary point a is found.

Next, the search goes to the leftward direction search for a second line just above the first line. First, a word 3 on the second line vertically corresponding to the block including the starting point S is read out of the memory, and a discrimination is made about whether the read information is "1" or "0". If "1" is found, the search goes to the rightward direction search. But, in this example, since all bits of the word 3 are "0", the "1/0 boundary search" is conducted in a leftward direction. Namely, words 4, 5 and 6 are sequentially read out of the memory, and the search for "1" is conducted. As seen from FIG. 2A, a boundary B is found in the word 6.

Figure 2B:
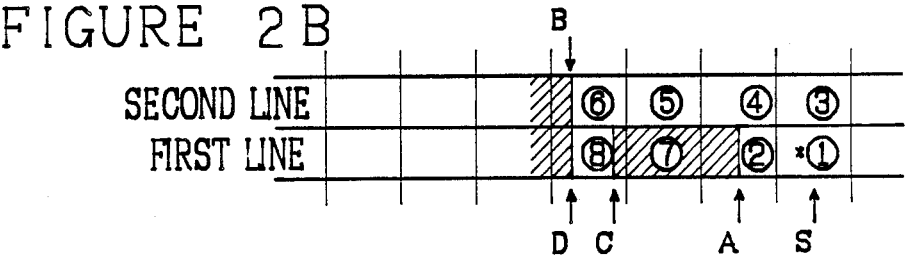

Here, whether or not an interval between the boundaries A and B is examined. If the interval is long, there is a possibility that an area which is not needed to be painted exists between the boundaries A and B. Therefore, the search returns to the first line so that words for the first line are read out from the word 2 including the boundary A, and the "0/1 boundary search" is conducted from a bit leftwardly adjacent to the point A. If the boundary is not found in the word 2, the leftwardly adjacent word 7 is read and then a similar search is repeated. As a result, as shown in FIG. 2B, if a boundary C is found when a word 8 is read and the boundary C exists between the boundaries A and B, it is judged that the point A is not a boundary to be detected for the first line. Accordingly, the search, i.e., the "1/0 boundary search" is started again for the first line. Consequentially, a correct boundary D is found.

Figure 2C:
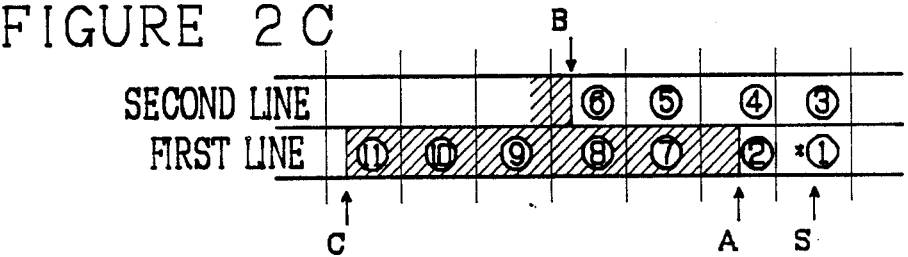

On the other hand, if the words 7 to 11 are sequentially read as shown in FIG. 2C so that the "0/1 boundary search" is repeated and then a boundary C is found at a leftside of the boundary B, it is judged that the boundary A is a correct boundary. Therefore, the leftward search is completed and the search goes to the rightward search.

As seen from the above, the conventional search method is required to continue to the search until "1" or "0" is found in the "1/0 boundary search" or in the "0/1 boundary search", respectively. In addition, a vain search is often executed as in the case shown in FIG. 2C. The search for the words 7 to 11 shown in FIG. 2C is not required if it had been previously known that a further search for the first line is no longer necessary when the boundary B is found for the second line. In other words, the conventional method has required a long time for search, resulting in a long time of the painting processing.

Further, although the word 2 was read in the first search for the first line, the word 2 is read again in the second search for the same first line. This needs an additional read cycle of the memory. In order to avoid the inconvenience, it can be considered to retain the data already read out of the memory. However, this is not so practical, since a large number of registers are required.

Turning to FIG. 3 there is shown a block diagram of an embodiment of the area searching system in accordance with the present invention.

The shown system comprises a processing unit 10 for supplying and receiving data from elements explained below and for controlling those elements. First, the processing unit 10 outputs a control signal 20 to a data reading unit 12 and sends and receives data from the data reading unit 12 via a bus 30. The data reading unit 12 outputs a read signal 22 to an associated memory 14 storing a pattern information, and reads out two words of data vertically adjacent to each other from the memory 14 via a bus 32. The data reading unit 12 outputs the two read-out words of data via a bus 34 to a search unit 16 for searching a boundary of "1" to "0" and/or a boundary of "0" to "1" within the two input words. This search unit 16 is coupled to the processing unit 10 via a bus 36, and is controlled by a control signal 24 from the processing unit 10, so as to output information indicative of a position of a boundary found in each of the two words. This boundary position information is inputted via bus 38 to a comparison unit 18 which is also coupled to the processing unit 10 via a bus 40. This comparison unit 18 is controlled by a signal 26 from the processing unit 10 for detecting in which of the two vertically adjacent words the boundary is found earlier than the other.

Now, operation of the shown system will be described with reference to FIG. 4 which illustrates a case similar to the case shown in FIG. 2 for making it easier to understand the feature and the advantage of the shown embodiment. Here, a line in which a search starting point lies is called a "first line", and a line just above or vertically upwardly adjacent to the first line is called a "second line". Further, such a search that the "1/0 boundary search" is conducted for the first line and the "1/0 boundary search" is conducted for the second line is called a "1/0–1/0 boundary search". In addition, another search that the 0/1 boundary search" is conducted for the first line and the "1/0 boundary search" is conducted for the second line is called a "0/1–1/0 boundary search".

Figure 4A:
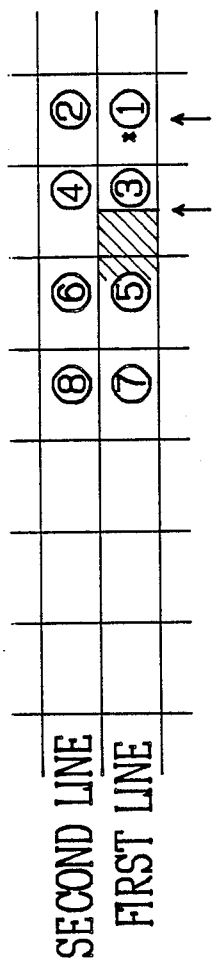
FIG. 4A, 4B and 4C illustrate a first manner in accordance with the present invention for searching an area to be painted.

First, since both a word 1 including the search starting point S and a word 2 just above the word 1 are all "0" in the example shown in FIG. 4A, the search is started with the "1/0–1/0 boundary search". Namely, the reading unit 12 reads out the word 1 of the first line including the starting point S and the word 2 vertically corresponding to the first word 1, and then outputs these read-out words to the search unit 16. The search unit 16 then conducts the "1/0–1/0 boundary search" for the two inputted words. In the example shown in FIG. 4A, since "1" is not found in any of the two words, the reading unit 12 reads out next two words 3 and 4, so that the same search is conducted. At this time, a boundary A is found in the word 3 for the first line.

This is notified to the processing unit 10, which in turn controls the search unit 16 to cause it to conduct the "0/1–1/0 boundary search" for the third and fourth words 3 and 4 in the leftward direction search from the A point. In this example, the boundary is not found in the words 3 and 4. Therefore, a further next pair of words 5 and 6 are read out and the "0/1–1/0 boundary search" is conducted. Succeedingly, a pair of words 7 and 8 are read out and the "0/1–1/0 boundary search" is conducted.

Figure 4B:
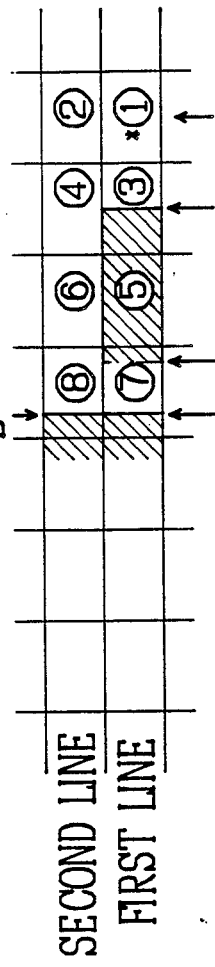

At this time, a boundary C is found in the word 7 for the first line and a boundary B is found in the word 8 for the second line as shown in FIG. 4B. The position information of the found boundaries are examined by the comparison unit 18. Since the C point is positioned at the right side of the B point, it can be judged that the C point is not a correct boundary for the first line (the most leftward boundary).

Figure 4C:
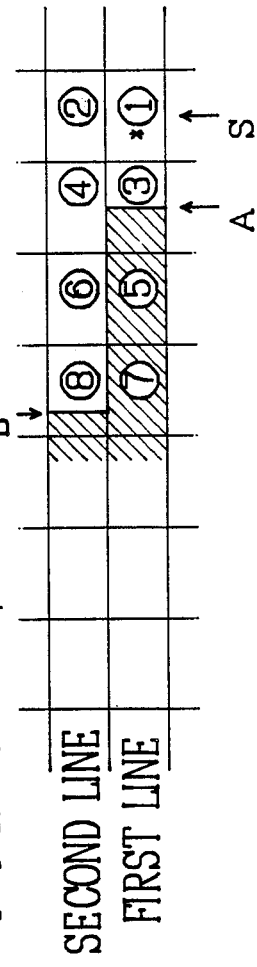

On the other hand, if a boundary is not found in the word 7 but the boundary B is found in only the word 8 as shown in FIG. 4C, the A point is judged to be the most leftward boundary for the first line, and then, the leftward search is completed.

In the example shown in FIG. 4B, the first and second lines have the leftward boundary at the same position as shown, and a boundary D for the first line is found at the same time when the boundary B is found.

If a correct boundary for the first line is found between the C point and the B point, the boundary thus found can be deemed to be a correct boundary for the first line. Otherwise, the above mentioned processing can be repeated.

Further, if a correct boundary for the first line is positioned at a leftside of the B point, the correct boundary can be found if the "1/0 boundary search" is conducted for only the first line by masking the data for the second line at a leftside of the B point.

In above mentioned example shown in FIG. 4, the first line has an area which should not be painted. But, the system shown in FIG. 3 can effectively search an area to be painted even in the case that the second line has an area which should not be painted.

Next, with reference to FIG. 5, a leftward searching operation of the area searching system will be explained in the case of searching the area to be painted when the second line has an area which should not be painted.

Here, such a search that the "1/0 boundary search" is conducted for the first line and the "1/0 boundary search" is conducted for the second line is called a "1/0–1/0 boundary search", similarly to the case explained with reference to FIG. 4. In addition, another search that the "1/0 boundary search" is conducted for the first line and the "0/1 boundary search" is conducted for the second line is called a "0/1–1/0 boundary search".

In this example, until the words 3 and 4 are read out, an operation similar to the first case shown in FIG. 4 is executed. Therefore, operation will be described after the words 3 and 4 are read out.

Figure 5A:
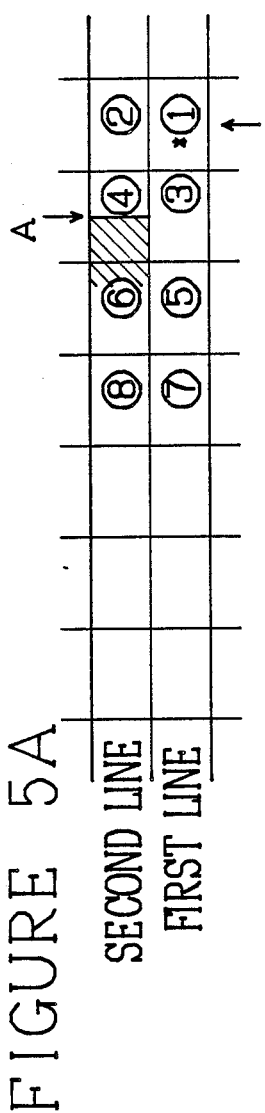
FIG. 5A, 5B and 5C illustrate a second manner in accordance with the present invention for searching an area to be painted.

As shown in FIG. 5A, the "1/0–1/0 boundary search" is carried out for the read-out words 3 and 4. As a result, a boundary A is found in the word 4 for the second line.

Thereafter, the "0/1–1/0 boundary search" is executed from the data at the leftside of the point A. But, in the example shown in FIG. 5, since a boundary does not exist in the word 3 and 4, a next pair of words 5 and 6 are read out and the "0/1–1/0 boundary search" is conducted. Succeedingly, a pair of words 7 and 8 are read out and the "0/1–1/0 boundary search" is conducted.

Figure 5B:
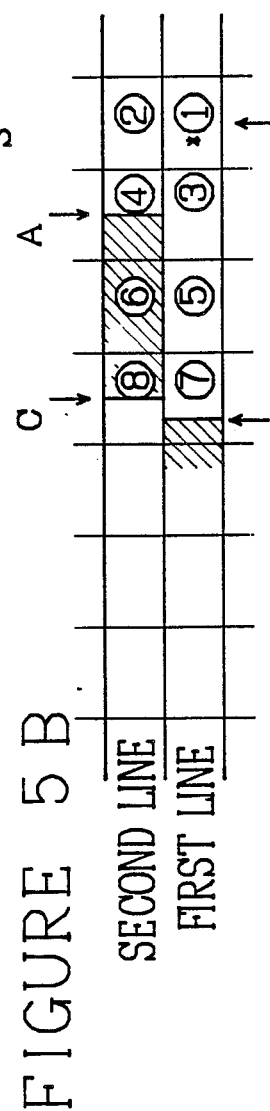

At this time, if a boundary C is found in the word 8 for the second line and a boundary B is found in the word 7 for the first line as shown in FIG. 5B, the position information of the found boundaries are examined by the comparison unit 18. Since the C point is positioned at the right side of the B point, it can be judged that the C point is not a correct boundary for the second line.

Figure 5C:
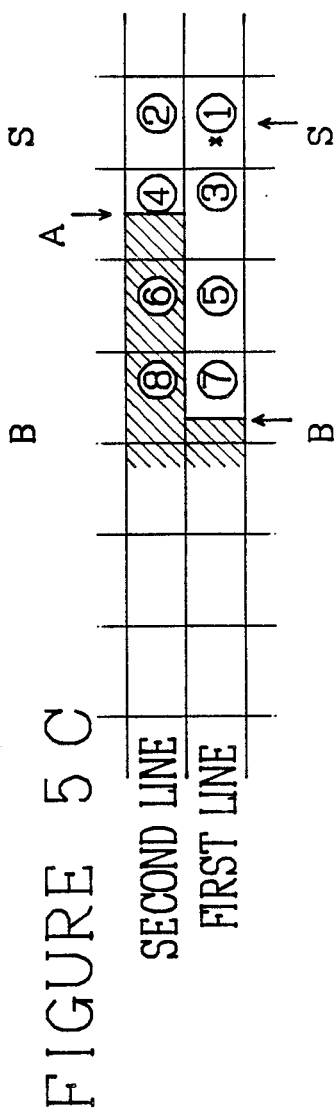

On the other hand, if a boundary is not found in the word 8 but the boundary B is found in only the word 7 as shown in FIG. 5C, the A point is judged to be the the most leftward boundary for the second line, and then, the leftward search is completed.

As seen from the above mentioned examples, the system in accordance with the present invention is so constructed to read a pair of words vertically adjacent to each other and to search a boundary in the read-out words at the same time, so that the positions of the found boundaries of the vertically adjacent lines are compared. With this simple processing, a boundary to be not detected or recognized, which would exists in respective words, can be easily discriminated.

Further, since the search is concurrently made for each two vertically adjacent words of each two vertically adjacent lines, a vain search will not be conducted, and therefore, a speed processing can be realized.

Particularly, in the case that the system is used for perfectly painting an internal area of any closed pattern, the time for searching all the internal area will substantially determine the speed of an overall processing. Therefore, the present invention can exert a great advantage in such a case.

Incidentally, in the above mentioned examples shown in FIG. 4B and 5B, the boundary of the area to be not painted can be detected, and therefore, area to be not painted can be defined from the detected boundaries of the area to be not painted.

The invention has thus been shown and described with reference to the specific embodiments. However, it should be noted that the present invention is in no way limited to the details of the illustrated structures but changes and modifications may be made within the scope of the appended claims.

I claim:

1. A system for searching a predetermined boundary of a closed pattern comprising a memory for storing data of a given closed pattern, a reading unit for sequentially reading each pair of vertically adjacent words of each pair of vertically adjacent lines of the given closed pattern from the memory in the same data reading direction, a search unit receiving the pair of vertically adjacent words from the reading unit for searching a boundary in each of the pair of vertically adjacent words and for generating data indicative of a position of a boundary found in each of the pair of vertically adjacent words, a comparison unit receiving the boundary position data of the each pair of vertically adjacent words so as to judge in which of the vertically adjacent words the boundary is found earlier than the other, and a processing unit coupled to the comparison unit for determining whether or not the found boundary is the predetermined boundary.

2. A system claimed in claim 1 wherein the search unit firstly conducts a boundary search for both of the pair of vertically adjacent words by detecting a change of a first logic value to a second logic value in the data reading direction, and after a boundary is found in a first line of the pair of vertically adjacent lines, the search unit executes a boundary search for a word of the first line in which the boundary has already been found, by detecting a change of the second logic value to the first logic value in the data reading direction, and on the other hand, the search unit continues the boundary search performed by detecting a change of the first logic value to the second logic value in the data reading direction, for a word of the other line in which the boundary has not yet been found.

3. A system claimed in claim 2 wherein after the first mentioned boundary is found in the first line, if a second boundary is found again in a word of the first line, the processing unit controls the searching unit to cause it to conduct, for a word of the first line again, the boundary search performed by detecting a change of the first logic value to the second logic value in the data reading direction, a boundary of the first line found thereafter being judged to be the predetermined boundary.

* * * * *

UNITED STATES PATENT AND TRADEMARK OFFICE
CERTIFICATE OF CORRECTION

PATENT NO. : 4,929,938

DATED : May 29, 1990

INVENTOR(S) : Ryuji HORIGUCHI

It is certified that error appears in the above-identified patent and that said Letters Patent is hereby corrected as shown below:

Col. 3, line 16, delete "ares" and insert --areas--.

Signed and Sealed this

Third Day of September, 1991

Attest:

HARRY F. MANBECK, JR.

Attesting Officer

Commissioner of Patents and Trademarks